United States Patent [19]

Eder

[11] 4,313,227
[45] Jan. 26, 1982

[54] LIGHT ENERGY INFORMATION TRANSMISSION SYSTEM

[75] Inventor: Kenneth C. Eder, Lubbock, Tex.

[73] Assignee: Texas Instruments Incorporated, Dallas, Tex.

[21] Appl. No.: 7,056

[22] Filed: Jan. 29, 1979

[51] Int. Cl.³ .............................................. H04B 9/00
[52] U.S. Cl. .................... 455/617; 455/608; 340/709; 340/711
[58] Field of Search ...................... 250/199; 273/101.1, 273/DIG. 28, 102.2 B, 85 G; 340/709, 703, 711, 724, 168 B; 455/608, 603, 617, 618, 619; 358/113

[56] References Cited

U.S. PATENT DOCUMENTS

| | | | |
|---|---|---|---|
| 4,045,777 | 8/1977 | Mierzwinski et al. | 340/168 B |
| 4,111,421 | 9/1978 | Mierzwinski | 340/706 |
| 4,150,284 | 4/1979 | Trenkler et al. | 455/608 |

Primary Examiner—Marc E. Bookbinder
Assistant Examiner—Edward L. Coles
Attorney, Agent, or Firm—Leo N. Heiting; Melvin Sharp; N. Rhys Merrett

[57] ABSTRACT

A light energy information transmission system for transmitting digital coded information as a modulated light signal. The light energy information transmission system is preferably comprised of four remote control units each of which transmits a series of amplitude modulated infrared information pulses at a discrete frequency and a single receiver module for demodulating the information pulses received from each control unit and for transmitting the information carried thereby to a computing system. Each portable control unit includes a digital joystick which is movable in any direction in an X-Y plane and a keyboard having a plurality of keyswitches for selectively inputting the information to be transmitted. The information is then encoded as a 12-bit data word, and transmitted as a series of amplitude modulated infrared pulses which are detected by the receiver module. The infrared pulses are reconverted to electrical pulses, demodulated and transmitted to the computing system. Each control unit has a channel selector for selecting a discrete carrier frequency to identify the particular control unit and the receiver module includes a switching circuit, automatically controlled by a digital processor, for selectively tuning the receiver to receive information from each control unit separately in a predetermined sequence.

35 Claims, 7 Drawing Figures

LIGHT ENERGY INFORMATION TRANSMISSION SYSTEM

BACKGROUND

This invention relates to information transmission systems and in particular to infrared information transmission systems having multiple transmitter units.

The use of remote control units to transmit information and thus eliminate cumbersome hard-wire connections between transmitter and receiver is known in the art. Transmitting information using infrared signals has proved invaluable for shortrange communication and for eliminating mutual interference with radio frequency signals. An infrared information transmission system is described in U.S. Pat. No. 3,927,316 in which frequency modulated infrared signals from a wideband FM transmitter are received by a wideband receiver and transmitted to a speaker system. Another infrared transmission system is described in copending U.S. Pat. No. 4,150,284. In this system, information is transmitted as a series of modulated infrared pulses from a remote transmitter unit to a receiver module where the pulses are processed and decoded. The remote transmitter unit contains a keyboard and joystick for inputting information.

Hertofore, prior art infrared information transmission systems have required separate circuitry for processing and decoding information from each transmitter. In addition, the frequencies at which the infrared signals are transmitted are unduly susceptible to interferece from 60 Hz and broadband noise. Furthermore, when portable transmitter units are employed, the power supply must be frequently recharged or replaced because the system continues to experience power drain when activated even if no information is being transmitted.

SUMMARY

It is therefore one object of the present invention to provide an improved infrared information transmission system.

It is another object of the present invention to provide an infrared information transmission system in which a single receiver module receives and processes coded infrared signals from a plurality of remote transmitter units.

Another object of the invention is to provide a receiver module for an infrared information transmission system which is selectively tuned to receive and process information signals from each of a plurality of remote transmitter units in a predetermined sequence.

It is yet another object of the invention to provide a remote transmitter unit for an infrared information transmission system which sequentially receives information inputs from a multi-position digital joystick and a multi-key digital keyboard and encodes the information for transmission.

It is a further object of the invention to provide an infrared information transmission system having a plurality of transmitter units wherein each transmitter unit includes an automatic power shut down feature to turn off the power supply to the transmitter unit when no new input information is generated for a selected period of time.

Still a further object of the invention is to provide an infrared information transmission system wherein the information is transmitted by amplitude modulated infrared pulses.

It is yet a further object of the invention to provide an infrared information transmission system having a receiver module which checks the incoming information signals for error and prevents transfer of erroneous information to a computing system or the like to which the receiver module is connected.

Still another object of the invention is to provide an infrared information transmission system for transmitting information signals which are relatively unsusceptible to low frequency and broadband noise interference.

These and other objects are accomplished in accordance with the present invention wherein a light emitting system is comprised of at least one portable control unit, which includes joystick and keyboard input means for generating respective first and second sets of input signals; digital processor means for selectively scanning the joystick and keyboard via selected output terminals and receiving input signals indicative of the position of the joystick and the state of the keyboard via selected input terminals; modulator means responsive to digital information signals generated by the digital processor means for modulating the information signals for transmission; and a light emitting device for receiving the modulated information signals and for transmitting coded light signals in synchronism therewith, and a receiver module, including a photodetector device or detecting the incoming light signals, and providing electrical information signals; a receiver circuit for receiving and processing the electrical information signals; and a demodulation circuit for demodulating the electrical information signals and generating data signals for transmission to a computing system or the like.

In another aspect of the invention, the control unit includes power supply means for the operation thereof and the digital processor means automatically disconnects the power supply means from the control unit when the digital processor means detects no new input signals from the joystick or keyboard for a predetermined period of time.

In yet another aspect of the invention, the light emitting system includes a plurality of portable control units each having controllable input means for generating input signals indicative of the information to be transmitted; coding circuit means coupled to the input means for receiving input signals and for generating coded information signals at respective discrete transmission frequencies; and a light emitting device for receiving the information signals and transmitting coded light signals in synchronism therewith. The receiver module includes tuning means for selectively tuning a receiver circuit to the discrete transmission frequency of each control unit in accordance with a predetermined sequence, information signals being received from each control unit in accordance with the predetermined sequence.

In still another aspect of the invention, each control unit includes channel selector means for controlling the coding circuit means to generate selected ones of a plurality of discrete transmission frequencies, each transmission frequency corresponding to a respective channel on which information from a respective control unit is transmitted.

In a preferred embodiment, four remote transmitter units, each transmitting amplitude modulated infrared information pulses at a discrete carrier frequency, are used. Each transmitter has an input device for entering the information to be transmitted and means for generating a unique carrier frequency signal. The input device is comprised of a digital joystick and keyboard connected to selected output terminals and common input terminals of a first digital processor, which scans the joystick and keyboard from the output terminals and receives information signals via the input terminals. The first digital processor then serially transmits a data signal comprised of 12 binary coded data bits representing each input signal from the joystick and keyboard. The data signals amplitude modulate the carrier frequency signal and are transmitted as a series of modulated infrared information pulses by an infrared light emitting device. The infrared pulses are detected by a photodetector in the receiver module and converted to an electrical information signal. An AM receiver circuit within the receiver module is tuned to one carrier frequency at a time for receiving information signals from each control unit separately. The receiver circuit is selectively tuned by a second digital processor in the receiver module to the carrier frequency of each transmitter unit to receive the information signals therefrom in sequence. The information signals are filtered, amplified, demodulated and shaped to form a square-wave input to the second digital processor. The second digital processor decodes the signals, checks them for errors and transmits valid data to the computing system.

The digital processor contained in each transmitter unit is programmed to shut down the power supply in the unit when no new input information from either the joystick or the keyboard is received by the digital processor for a selected period of time, typically five minutes. This feature increases the life of the power supply in the portable units by preventing unnecessary current drain when no information is being transmitted.

BRIEF DESCRIPTION OF THE DRAWINGS

Still further objects and advantages of the invention will be apparent from the detailed description and claims when read in conjunction with the accompanying drawings wherein:

DETAILED DESCRIPTION OF A PREFERRED EMBODIMENT

Figure 1:
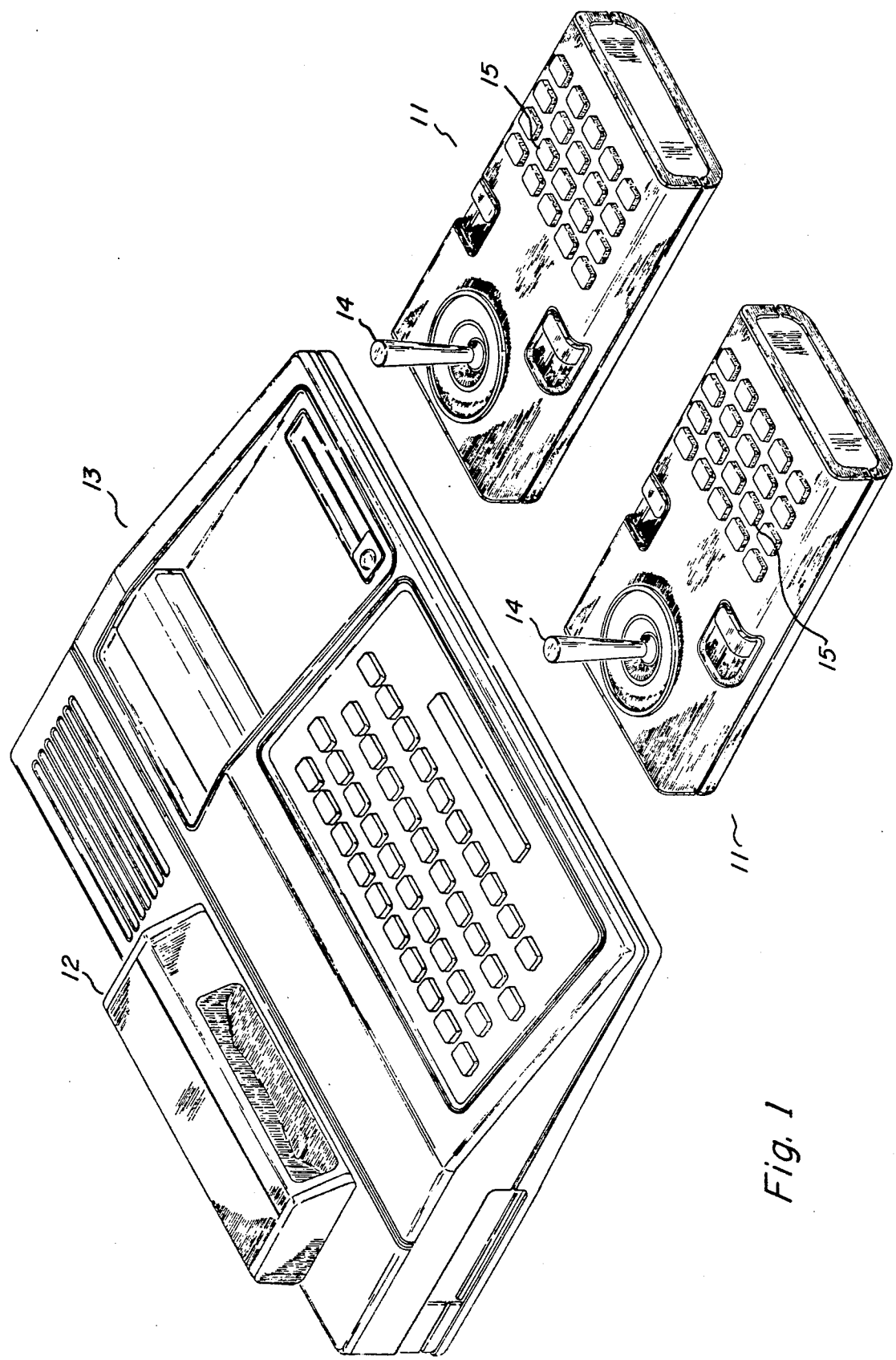
FIG. 1 is a perspective view of the infrared information transmission system of the present invention interfaced with a computing system.

FIG. 1 shows the infrared information transmission system of the present invention with a computing system of the personal or home type. The information transmission system includes a plurality of hand-held battery powered remote transmitter units 11 and a receiver module 12 mounted on the main console of computing system 13 and electrically interfaced therewith. Each transmitter unit 11 has a joystick 14 and a 4×5 keyboard 15 for inputting information to be transmitted. Transmiter unit 11 sends the information as an amplitude modulated infrared signal to receiver module 12, which reconverts the infrared signal to an electrical signal, demodulates it and transmits the information to computing system 13. Receiver module 12 is able to distinguish between each transmitter unit 11 on the basis of the discrete carrier frequency at which the amplitude modulated infrared signal is transmitted. Receiver module 12 selectively tunes in one transmitter unit 11 at a time and receives information therefrom in accordance with a predetermined sequence. Further details regarding the operation of the infrared information transmission system of the present invention will be described with reference to transmitter unit 11 and receiver module 12 individually.

THE TRANSMITTER UNIT

Figure 2:
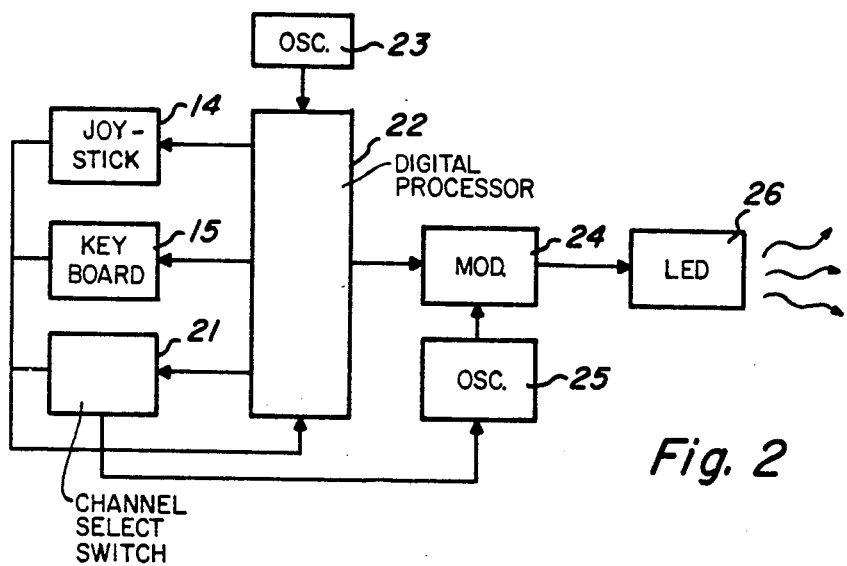
FIG. 2 is a block diagram of the major components of a transmitter unit of the transmission system of the present invention.

Referring to FIG. 2 transmitter unit 11 contains a channel selection switch 21 by means of which the transmission channel, i.e. the particular carrier frequency, is selected. Digital processor 22 scans joystick 14, keyboard 15 and channel selection switch 21 in a continuous manner to detect any change of position of joystick 14 and change of state of keyboard 15 and to determine the position of switch 21. Digital processor 22 is supplied with a 300 KHz signal input from external oscillator 23. When digital processor 22 detects a change in joystick 14 or keyboard 15, it transmits a 12 bit coded data pulse serially to modulator 24, which amplitude modulates the incoming carrier frequency signal from carrier frequency oscillator 25 with the data pulse. The modulated information signal is sent to infrared light-emitting device 26 whereupon infrared information pulses in synchronism with the incoming modulated information signal are transmitted. The output frequency of carrier frequency oscillator 25 is controlled by the position of channel selection switch 21.

Figure 3:
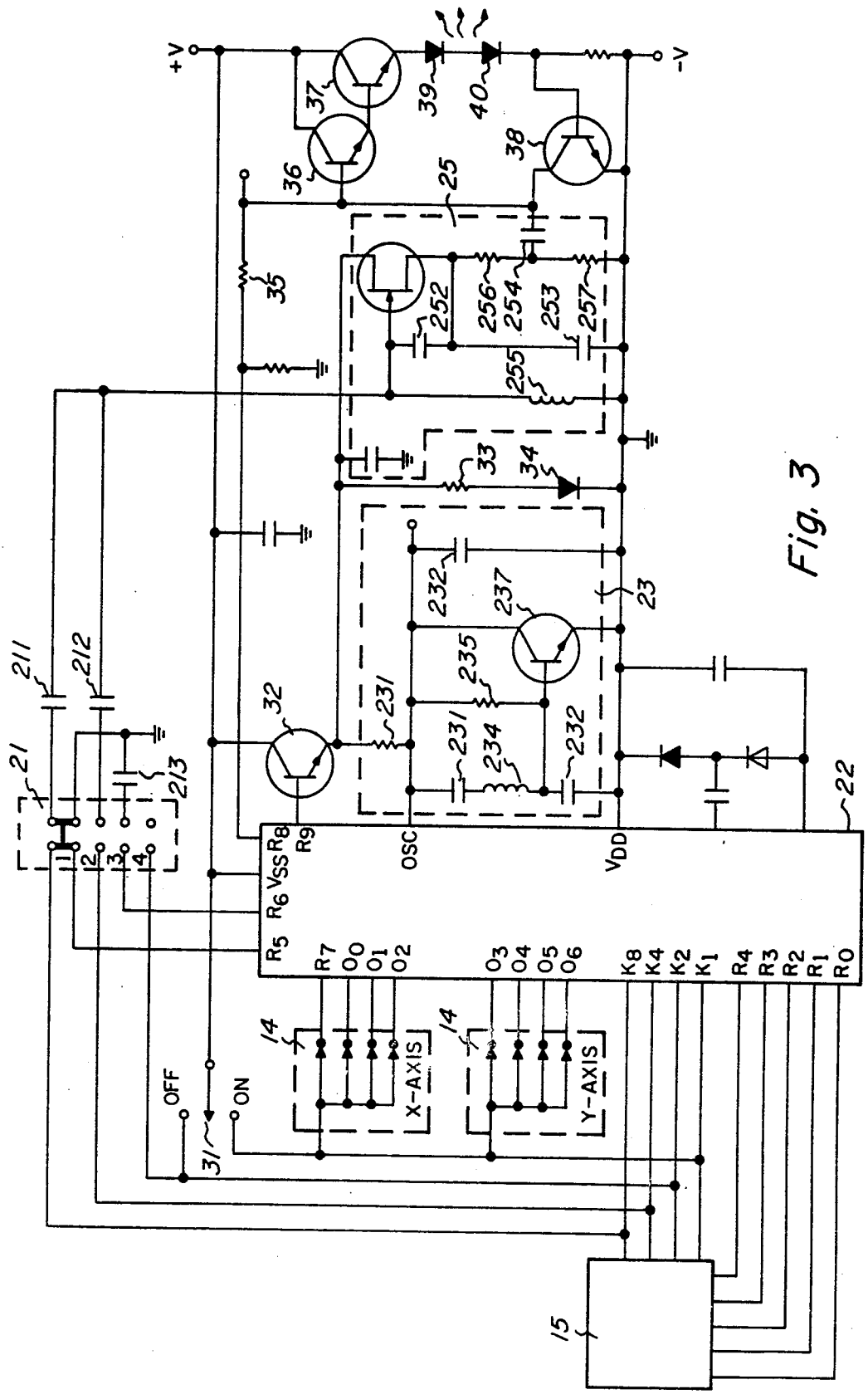
FIG. 3 is a circuit diagram of the transmitter unit.

FIG. 3 shows in detail the electronic circuitry comprising a preferred embodiment of transmitter unit 11.A 9 volt battery power supply is connected to terminals labeled +V and −V. Digital processor 22 is a microcomputer of the TMC 1985 type on a single semiconductor chip having an on-chip ROM containing a permanent control program and RAM for storing information while it is being processed. The TMC 1985 microcomputer is manufactured and sold as a standard product by Texas Instruments Inc., assignee of the present invention. Joystick 14 is constructed to provide for 224 active positions plus the neutral vertical position. Each of these positions generates a unique eight bit grey coded, digital signal, four bits representing the incremental position along an X-axis and four bits representing the incremental position along a Y-axis. Joystick 14 is preferably of the type described and claimed in allowed U.S. Pat. No. 4,161,726. Keyboard 15 is preferably a 4×5 matrix keyboard having 20 keyswitches. Activation of each keyswitch generates a unique five bit binary coded signal.

Channel selection switch 21 is manually settable for four distinct positions 1, 2, 3 and 4, representing four distinct transmission channels 1, 2, 3 and 4, respectively. The output frequency of carrier frequency oscillator 25 is controlled by the position of channel selection switch 21. Each position/channel 1, 2, 3 and 4 represents a discrete carrier frequency value. When channel selection switch 21 is in position 1, as shown in FIG. 3, tuning capacitor 211 is coupled to oscillator 25 thereby changing the carrier frequency output. Similarly, when channel selection switch 21 is moved to positions 2 and 3, tuning capacitor 212 and capacitors 212 and 213, respectively, are coupled to oscillator 25. When switch 21 is in position 4, oscillator 25 is tuned to its normal frequency, typically 130 KHz. In a preferred embodiment, channels 1, 2, 3 and 4 correspond to carrier frequencies of 70 KHz, 90 KHz, 110 KHz and 130 KHz, respectively, as shown in Table I on page 15.

The sequence of transmission of information from transmitter unit 11 is as follows. Power is applied to transmitter unit 11 by momentarily moving spring-loaded switch 31 to the ON position. Switch 31 normally remains in a center or neutral position as shown in FIG. 3. Digital processor 22 is connected to the 9 volt battery power supply via terminals Vss and Vdd and immediately begins operation upon moving switch 31 momentarily to ON. Digital processor 22 switches on transistor 32 from output terminal R9 and allows power to be transmitted to external oscillator 23 and carrier frequency generator 25 for the operation thereof. Power is also transmitted through resistor 33 to light-emitting diode 34, which lights up as an indication that power is on. Oscillator 23, which is delineated by dotted lines, includes capacitors 231, 232 and 233, inductor 234, resistors 235 and 236 and transistor 237. Oscillator 23 supplements the internal oscillator of digital processor 22 and provides a stable source of 300 KHz clocking signals for the operation of digital processor 22 through the input terminal labeled OSC.

Once energized, digital processor 22 scans joystick 14 and keyboard 15 continually for new information to be transmitted. As previously mentioned, digital processor 22 also scans channel selection switch 21 to determine the position thereof. By selectively setting output terminals R7, O0, O1, O2, O3, O4, O5 and O6, digital processor 22 scans joystick 14 and receives on input terminal K1 an 8-bit binary coded input signal indicative of the X and Y positions of joystick 14. Similarly, by selectively setting output terminals R0, R1, R2, R3 and R4, digital processor 22 scans keyboard 15 and receives a 5-bit binary coded input signal indicative of the state of the keyswitches of keyboard 15 on input terminals K1, K2, K4 and K8.

When a new activity is detected in joystick 14 or keyboard 15, digital processor 22 generates a 12 bit coded data pulse and transmits it serially from output terminal R8 through resistor 35 to the base of NPN transistor 36. Each 12 bit data pulse is transmitted eight times at a rate of 2 KHz with a 3 millisecond gap between each pulse. The data pulse includes two bits identifying the particular transmitter unit 11 from which the information is sent and one parity bit to allow receiver module 12 to check the data pulse for error. The parity bit indicates whether there is an odd or even number of binary coded 1's in the data pulse. For example, a binary coded 1 in the parity bit position indicates there an odd number of binary coded 1's in the 12 bit data pulse while a binary coded 0 in the parity bit position is indicative of an even number of binary coded 1's in the data pulse. Thus all error-free data pulses should contain an even number of logical 1's.

Oscillator 25, which includes capacitors 251, 252, 253 and 254, inductor 255 and resistors 256 and 257, generates an approximately sine wave carrier frequency signal at the discrete frequency to which oscillator 25 is tuned. Transistor 38 functions as a voltage regulator to provide a stable voltage for the carrier frequency signal. The 12 bit data pulses transmitted through resistor 35 turn on transistors 36 and 37, which form a Darlington pair, and amplitude modulate the carrier frequency signal from oscillator 25. Transistors 36 and 37 serve as current amplifiers to amplify the modulated signal for transmission by infrared light-emitting diodes 39 and 40. Diodes 39 and 40 emit infrared energy pulses of approximately sine wave shape in synchronism with the amplitude modulated carrier frequency signal.

Figure 4:
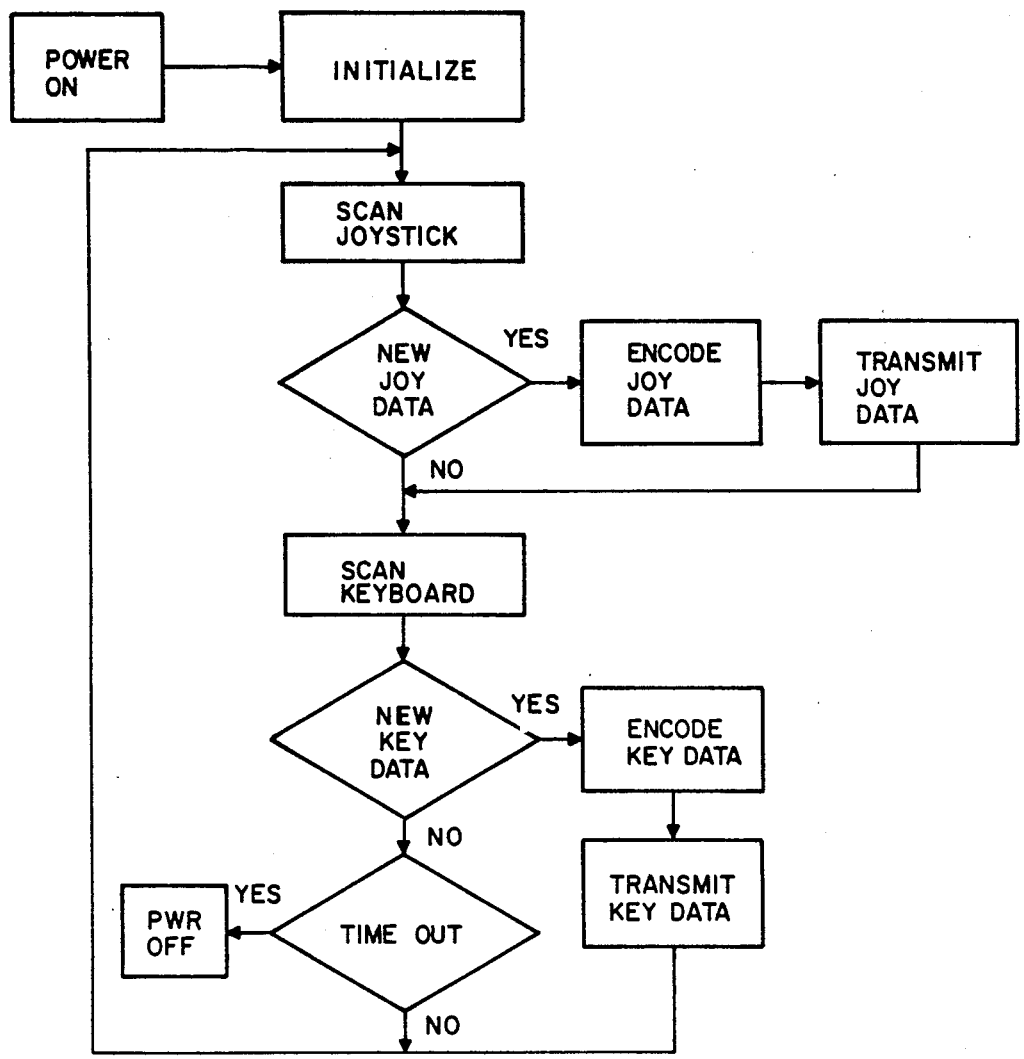
FIG. 4 is a flow diagram of the sequence of operation of the digital processor contained in the transmitter unit.

Referring to FIG. 4, the cycle of operation of digital processor 22 is depicted as a flow diagram. When energized, digital processor 22 begins scanning joystick 14 for new activity. If new activity is detected, it is encoded as a 12-bit data word including the unit identification code and parity code and transmitted serially as a 12-bit data pulse. Digital processor 22 then scans keyboard 15 for new activity, encodes it and transmits it as a 12-bit data word in a manner similar to that described with respect to new data from joystick 14. The cycle is repeated again until all the input data from joystick 14 and keyboard 15 is transmitted. Digital processor 22 continues scanning joystick 14 and keyboard 15 for new data and monitors the amount of time elapsed since new data from either joystick 14 or keyboard 15 was detected. If no new data is detected for a selected period of time, which is typically five minutes, for which digital processor 22 is programmed, digital processor 22 generates a TIME OUT signal and automatically turns off power to transmitter unit 11. This is an important feature of the present invention because it prevents wasteful drain on the battery power supply when no information is being transmitted, thereby increasing the life expectancy of the power supply of transmitter unit 11.

THE RECEIVER MODULE

Figure 5:
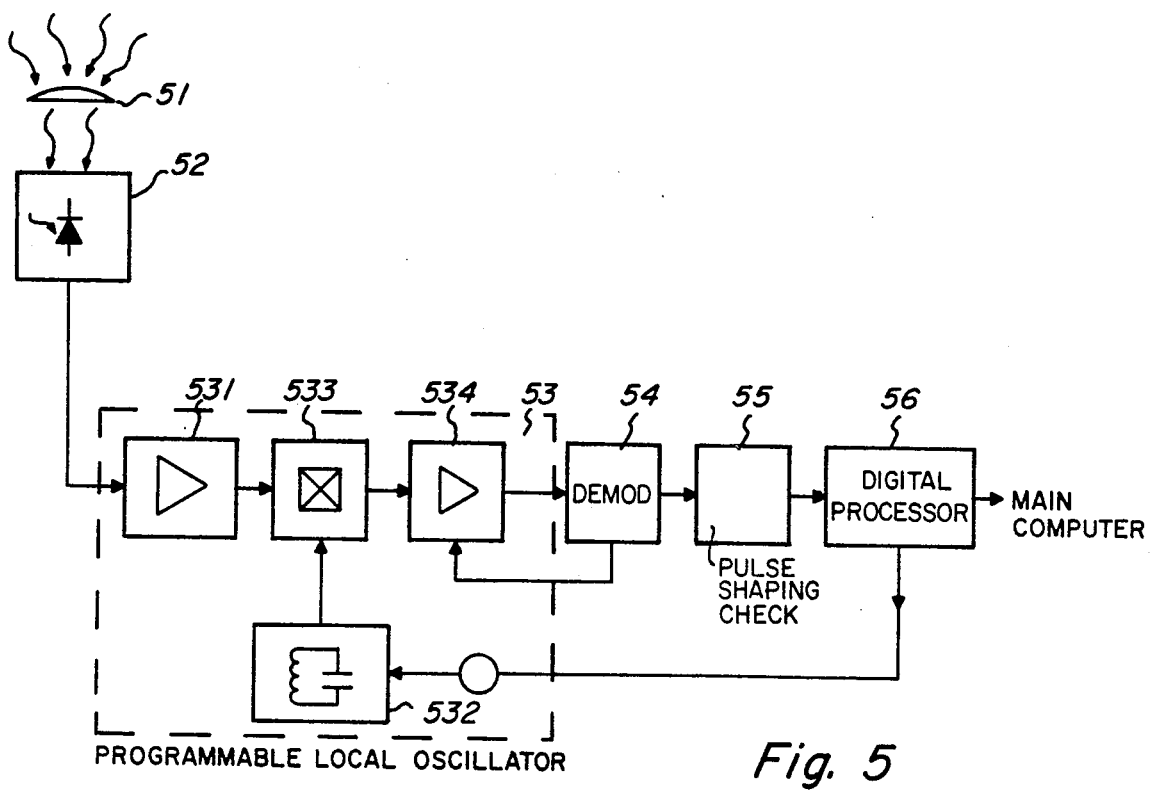
FIG. 5 is a block diagram of the major components of the receiver module of the infrared information transmission system of the present invention.

Referring to FIG. 5, receiver module 12 includes optical lens 51 for focusing the incoming infrared energy signals and photodiode 52 for receiving the infrared signals and converting them to electrical information signals. The electrical information signals, which are comprised of the 12 bit data pulses sent from transmitter units 11, are fed into a standard amplitude modulation (AM) receiver 53, which is tuned to the carrier frequency of one transmitter unit 11 at a time. The information signals are amplified by preamplifier 531, mixed by mixer 533 with a frequency signal generated by programmable local oscillator 532 and filtered to remove noise and signals which are not within the band of frequencies to which AM receiver 53 is tuned. After mixing, the information signals are at a resultant frequency which is the sum total of the carrier frequency and the frequency output of oscillator 532. The filtered signals are then amplified by amplifier 534, the gain of which is controlled by demodulator circuit 54.

Demodulator circuit 54 receives the information signals and demodulates them by removing the 2 KHz coded data signals from the resultant frequency signals. The coded data signals are then transmitted to a pulse shaping circuit 55, which includes a comparator, and shaped to provide square wave data signals as inputs to digital processor 56. Digital processor 56 decodes the data signals, checks them for errors and transmits valid data to main computing system 13.

Figure 6:
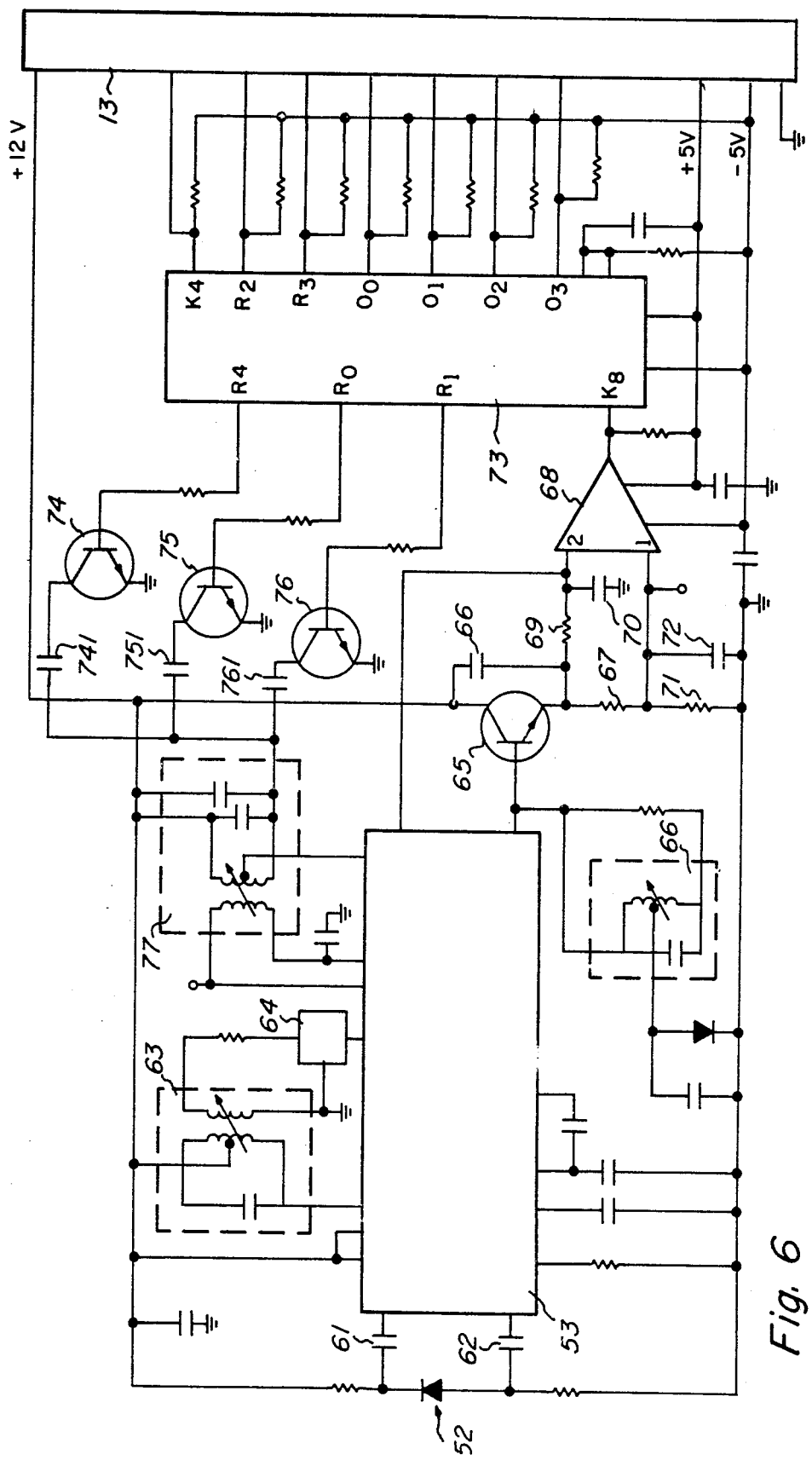
FIG. 6 is a circuit diagram of the receiver module.

A preferred embodiment of the electrical components comprising receiver module 12 is shown in FIG. 6. The incoming infrared energy signal is received by photodiode 52 and converted to an electrical information signal in synchronism with the incoming infrared signal. AM receiver 53, which is preferably of the TCA-440 type, manufactured and sold by Signetics Corp., receives the information signal as a differential input through capacitors 61 and 62. As previously mentioned, the information signal is amplified and mixed with the output frequency of oscillator 532 to provide an information signal at the resultant frequency. After mixing, selectivity is applied to the signal by tank circuit 63, which is tuned to a resonant frequency of 455 KHz, and ceramic filter 64 to remove unwanted noise and signals at resultant frequencies outside a narrow band (2–5 KHz depending upon the carrier frequency) centered around 455 KHz. The signal is then amplified within AM receiver 53, tuned by tank circuit 66 to 455 KHz and transmitted to the base of transistor 65.

Transistor 65 detects the information signal and, along with capacitor 66, removes the 455 KHz signal from the data pulses thereby demodulating the information signal. At this point, the signal is comprised of a series of distorted data pulses at the data frequency of approximately 2 KHz. Data pulses are transmitted through resistor 67 to input 1 of comparator 68. Resistor 69 and capacitor 70 alter the data pulses to provide a DC signal which is the average of the peak to peak voltage of the data pulses to input 2 of comparator 68. Comparator 68, together with resistors 67, 69 and 71 and capacitors 70 and 72, shape the data pulses to provide approximately square wave data pulses to input terminal K8 of digital processor 73.

Digital processor 73 is preferably a microcomputer of the TMS 1030 type on a single semiconductor chip having an on-chip ROM containing a permanent control program and RAM for storing information while it is being processed. The TMS 1030 microcomputer is manufactured and sold as a standard product by Texas Instruments Inc., assignee of the present invention. Digital processor 73 receives the data pulses, decodes them and checks the unit code and parity bits for errors. Valid data is transmitted to computing system 13. Receiver module 12 is plugged directly on to the main frame of computing system 13 to establish an interface therebetween (see FIG. 1). As shown in FIG. 6, computing system 13 provides DC power for receiver module 12 via four interface connections (+12 v, +5 v, −5 v and ground). Another seven interface connections are used to transmit data from digital processor 73 to computing system 13.

The sequence of information transmission begins when digital processor 73 raises an INTERRUPT flag on output terminal R2, telling computing system 13 that digital processor 73 has new information to transmit. The 12 bits of data comprising each separate information signal are transmitted as a series of 4-bit data bytes from output terminals O0, O1, O2 and O3. A DATA VALID signal is transmitted from output terminal R3 with each 4-bit byte to indicate the validity of the data being transmitted. The central processing unit (CPU) of computing system 13 transmits a DATA REQUEST signal, which is received on input terminal K4, indicating that the INTERRUPT flag has been honored and that the first 4-bit byte of data has been received and processed. Upon receipt of the DATA REQUEST signal, the INTERRUPT flag is dropped. The abovedescribed sequence is repeated for each information signal that is sent to computing system 13.

In a unique feature of the invention, digital processor 73 is programmed to selectively tune AM receiver 53 to receive information signals from each transmitter unit 11 in accordance with a predetermined sequence programmed therein. Digital processor 73 switches on transistors 74, 75 and 76 in sequence by means of electrical signals from output terminals R4, R0 and R1, respectively, thereby coupling capacitors 741, 751 and 761, respectively, to tank circuit 77. Tank circuit 77 is tuned to 385 KHz and functions to control the output of programmable local oscillator 532 within AM receiver 53. When none of transistors 74, 75 and 76 are switched on, tank circuit 77 causes oscillator 532 to send out a signal of 385 KHz. When this 385 KHz signal is mixed with an incoming information signal having a carrier frequency of 70 KHz, the resultant frequency is 455 KHz, (385+70) which is allowed to pass through tank circuit 63 and filter 64 for amplification and processing. On the other hand, if the 385 KHz signal is mixed with an incoming information signal having a carrier frequency of 90 KHz, 110 KHz, or 130 KHz, for example, the resultant frequency is greater than 455 KHz and the signals will be filtered out and not processed. Thus AM receiver 53 is tuned to receive and process only information signals from transmitter unit 11 having a carrier frequency within a narrow band centered at 70 KHz. The frequencies to which local oscillator 532 is tuned are listed in Table I on page 15.

By selectively switching on transistors 74, 75, and 76, digital processor 73 changes the frequency to which tank circuit 77 is tuned thereby changing the output frequency of local oscillator 532. For example, if transistor 74 is switched on, capacitor 741 tunes tank circuit 77 to 365 KHz. The output of oscillator 532 is then 365 KHz which yields a resultant frequency of 455 KHz when mixed with incoming information signals having a carrier frequency of approximately 90 KHz. Thus AM receiver 53 is now tuned to a different transmitter unit 11. Each transmitter unit 11 has a distinct carrier frequency/transmission channel associated with it. Information signals from a plurality of transmission channels are received and processed by a single receiver module 12 using the same circuitry.

Figure 7:
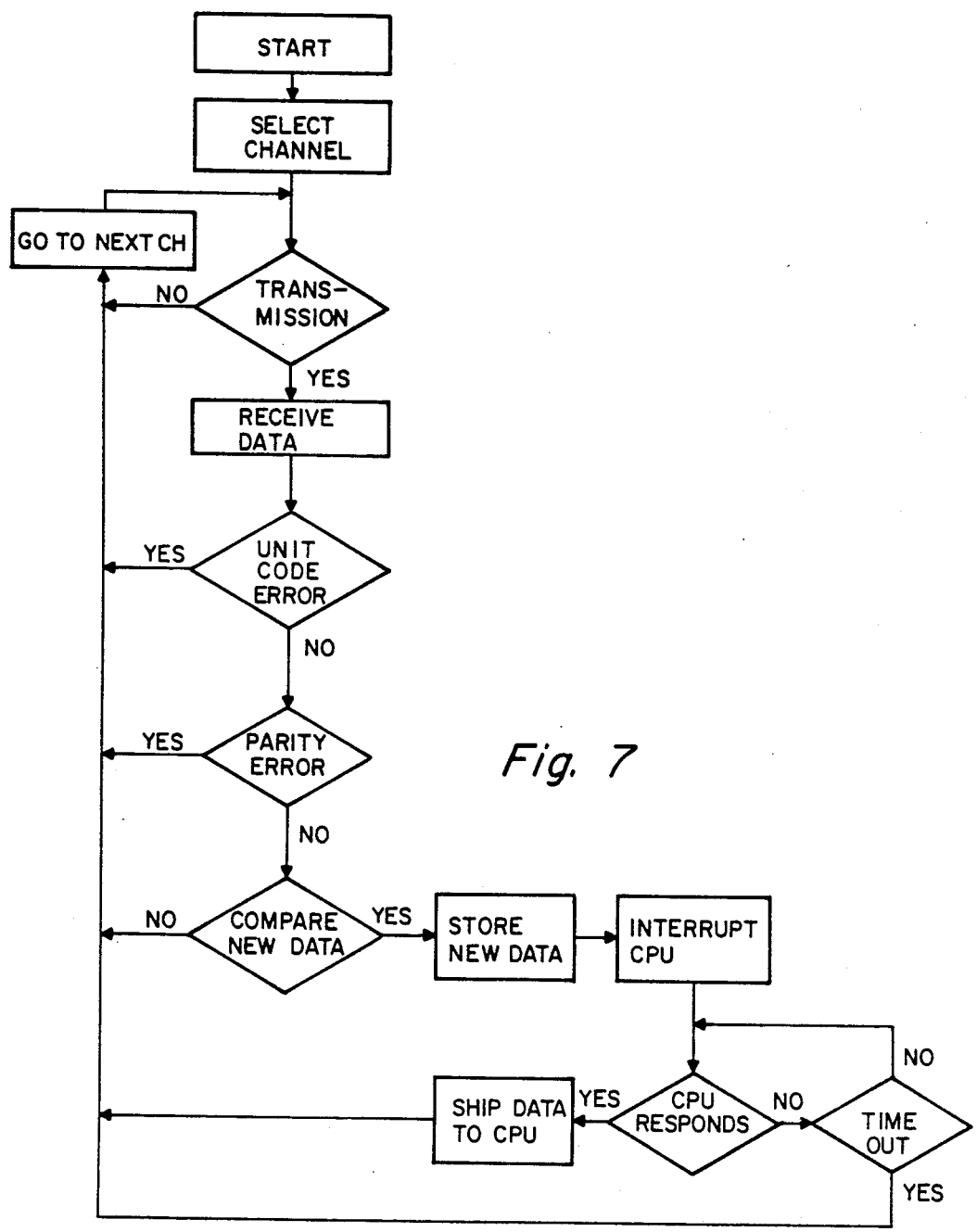
FIG. 7 is a flow diagram of the sequence of operation of the digital processor contained in the receiver module.

FIG. 7 depicts the sequence of operation of digital processor 73. Beginning with channel 1 (70 KHz carrier frequency), digital processor 73 receives data on each channel in sequence. It checks the data for the proper unit code and parity bit code and goes on to the next channel if an error is found. If no error is detected, digital processor 73 compares the data with data already stored therein for transmission. If the incoming data is not new (i.e. it has already been stored in digital processor 73 for transmission to computing system 13), digital processor 73 goes on to the next channel and repeats the above described sequence. If the data is new, digital processor 73 stores it and raises the INTERRUPT flag. If the CPU of computing system 13 responds with a DATA REQUEST signal back, the 12 bits of data comprising the information signal are transmitted as a series of 4-bit bytes to computing system 13. Digital processor 73 then goes on to the next channel and repeats the sequence. If the CPU does not respond, digital processor 73 continues the INTERRUPT flag and monitors the time during which the INTERRUPT flag is raised and no response is received. At the end of a predetermined time period, typically five minutes, it detects a TIME OUT condition and automatically goes on to the next channel.

The infrared information system described herein allows a multiplicity of transmission channels to be received and processed by a single receiver circuit in a controlled sequence. The system provides a channel isolation factor of 4:1, permitting effective receipt of transmissions from the tranmitter unit 11 to which receiver module 12 is tuned at distances up to four times farther away from receiver module 12 than other transmitter units 11 without cross-channel interference. Maximum effectiveness is achieved when transmitter unit 11 is positioned within 15 feet of receiver module 12. Furthermore, the relatively high carrier frequencies (70, 90, 110, 130 KHz) used to transmit the information are much less susceptible to 60 Hz and broadband noise interference than lower frequencies (5-7 KHz) used in prior art transmission systems. Finally, the automatic power down feature programmed into digital processor 22 in transmitter unit 11 shuts off power to unit 11 after no new input data has been detected for transmission for a period of five minutes. This feature conserves the battery power supply of transmitter unit 11.

Since many additional changes and modifications to the above-described details may be made without departing from the nature and spirit of the invention, it is understood that the invention is not to be limited to said details except as set forth in the appended claims.

TABLE I

CHANNEL FREQUENCIES AND TOLERANCES

| CHANNEL | CARRIER FREQ. KHZ | TRANSMITTER TOLERANCE KHZ | RECEIVER LOCAL OSCILLATOR FREQUENCY KHZ | RCVR TOLERANCE KHZ | CERAMIC FILTER TOLERANCE KHZ | MAXIMUM DEV. KHZ |
|---|---|---|---|---|---|---|
| 1 | 70 | ± 1.31 | 385* | ± 0 | ± 1.5 | ± 2.81 |
| 2 | 90 | ± 1.25 | 365 | ± 1.25 | ± 1.5 | ± 4.0 |
| 3 | 110 | ± 1.21 | 345 | ± 2.25 | ± 1.5 | ± 4.96 |
| 4 | 130* | ± 0 | 325 | ± 3.5 | ± 1.5 | ± 5.0 |

*THE RECEIVER AND THE TRANSMITTER ARE TUNED AT THESE FREQUENCIES.

What is claimed is:

1. A light-emitting system for information transmission comprising:
   (a) at least one portable control unit including:
      (i) a digital joystick movable along an X-axis and a Y-axis for generating a first set of digital input signals indicative of the incremental position of said joystick along the X-axis and along the Y-axis;
      (ii) a keyboard having a plurality of key switches for generating a second set of digital input signals indicative of the respective states of the key switches;
      (iii) a digital processor means having a plurality of input and output terminals, said joystick and said keyboard being coupled between selected input and output terminals of said digital processor means, said digital processor means for selectively scanning said joystick and said keyboard via said selected output terminals and receiving said first and second sets of input signals via said selected input terminals, said digital processor means for generating respective digital coded information signals in accordance with said input signals;
      (iv) modulator means coupled to said digital processor means for receiving said digital coded information signals, said modulator means including means for generating a discrete carrier frequency signal, said carrier frequency signal being modulated by said information signals to provide modulated information signals for transmission; and
      (v) a light-emitting device coupled to said modulator means for receiving said modulated information signals, said light-emitting device transmitting coded light signals in synchronism with said modulated information signals; and
   (b) a receiver module including:
      (i) a photodetector device for altering an electrical signal in accordance with the light signals received from said light-emitting device to provide electrical information signals in synchronism with said light signals;
      (ii) a receiver circuit tuned to the discrete carrier frequency for receiving and processing the electrical information signals; and
      (iii) demodulation circuit means coupled to said receiver circuit means for removing the carrier frequency signal from the electrical information signals and generating demodulated data signals for transmission to a computing system or the like.

2. The system according to claim 1 wherein said joystick and keyboard are respectively coupled to first and second sets of said output terminals of said digital processor means and to selected ones of said input terminals, said joystick and said keyboard being coupled to at least one common input terminal.

3. The system according to claim 1 wherein said control unit includes power supply means for the operation thereof and said digital processor means automatically disconnects said power supply means from said control unit when said digital processor means detects no new input signal for a predetermined period of time.

4. The system according to claim 1 wherein said digital coded information signal generated by said first digital processor means is comprised of a plurality of binary coded data bits transmitted as a series of pulses.

5. The system according to claim 1 wherein said light-emitting device is an infrared light-emitting diode and said light signals are infrared information signals.

6. The system according to claim 5 wherein said modulated information signals are comprised of a series of amplitude modulated information pulses and said infrared information signal is a series of infrared energy bursts in synchronism with said information pulses.

7. The system according to claim 1 wherein said receiver module also includes a digital processor means having an input coupled to the output of said demodulation circuit means for receiving said demodulated data signals, said digital processor means being responsive thereto for decoding said data signals and transmitting digital data to said computing system or the like.

8. The system according to claim 7 wherein said receiver module includes a signal shaping circuit for receiving and altering the demodulated data signals to provide a square-wave signal input for said digital processor means.

9. A light-emitting system for information transmission, comprising:

(a) a plurality of portable control units each having:
   (i) controllable input means for generating an input signal indicative of the information to be transmitted;
   (ii) coding circuit means coupled to said input means for receiving said input signal and for generating a coded information signal at a discrete transmission frequency;
   (iii) a light-emitting device coupled to said coding circuit means for receiving said information signal, said light-emitting device transmitting a coded light signal in synchronism with the information signal; and (b) a receiver module including:
   (i) a photodetector device for altering an electrical signal in accordance with the light signals received from said light-emitting devices to provide electrical information signals in synchronism with respective light signals;
   (ii) a signal receiver circuit selectively tuned to the discrete transmission frequency of each of said control units for receiving and processing the electrical information signals indicative of the information transmitted from each control unit in accordance with a predetermined sequence;
   (iii) tuning channel selection means for selectively tuning said receiver circuit to the discrete transmission frequency of each control unit in accordance with the a predetermined sequence, each transmission frequency corresponding to a respective channel on which information from a respective control unit is received; and
   (iv) decoding circuit means coupled to said receiver circuit for decoding the electrical information signals and generating decoded data signals indicative of the information received from the respective control units for transmission to the computing system or the like.

10. The system according to claim 9 wherein the tuning means of said receiver module includes controllable switching means for coupling selected ones of a plurality of tuning capacitors to said signal receiver circuit for tuning the receiver circuit to receive information from each control unit in accordance with the predetermined sequence.

11. The system according to claim 9 wherein each control unit includes channel selector means for controlling the coding circuit means to generate selected ones of a plurality of discrete transmission frequencies.

12. The system according to claim 11 wherein said channel selector means of said control units is comprised of controllable switch means having a plurality of switch positions for coupling selected ones of a plurality of tuning capacitors to said coding circuit means in accordance with the respective position of said switch means, each of said tuning capacitors controlling the coding circuit means to generate a selected one of a plurality of discrete transmission frequency signals.

13. The system according to claim 9 wherein said input means includes a digital joystick, said joystick being moveable in any direction along an X-axis and a Y-axis, said digital joystick generating a unique digital coded input signal in accordance with the incremental position of said joystick along the X-axis and along the Y-axis.

14. The system according to claim 13 wherein said input means further includes a keyboard having a plurality of keyswitches, each of said keyswitches generating a unique digital coded input signal.

15. The system according to claim 14 wherein each of said control units includes a first digital processor means having a plurality of input and output terminals, selected ones of said input terminals being coupled to said input means for receiving said input signal and for transmitting a digital data signal indicative of said input signal via at least one output terminal to said coding circuit means.

16. The system according to claim 15 wherein said joystick and said keyboard are coupled between selected output and input terminals of said first digital processor means, said first digital processor means selectively scanning said joystick and said keyboard via said selected output terminals and receiving digital coded input signals indicative of the incremental position of said joystick and the state of said keyswitches via said selected input terminals.

17. The system according to claim 15 wherein each of said control units includes a power supply means for the operation thereof and said first digital processor means automatically disconnects the power supply means from said control unit when said first digital processor means detects no new input signal from said input means for a predetermined period of time.

18. The system according to claim 15 wherein said digital data signal transmitted by said first digital processor means is comprised of a plurality of binary coded data bits transmitted as a series of pulses.

19. The system according to claim 9 wherein said receiver module includes a second digital processor means having an input coupled to the decoding circuit means for receiving the decoded data signals therefrom, said second digital processor means transmitting digital data to the computing system or the like.

20. The system according to claim 19 wherein said receiver module includes a signal shaping circuit for receiving and altering the decoded data signals to provide a square-wave signal input for said second digital processor means.

21. The system according to claim 19 wherein said second digital processor means automatically controls said tuning means of said receiver module to selectively tune said signal receiver circuit to receive information from each control unit separately in accordance with the predetermined sequence.

22. The system according to claim 9 wherein said light-emitting device is an infrared light-emitting device and said light signal is an infrared information signal.

23. The system according to claim 22 wherein said coded information signal is comprised of a series of information pulses and said infrared information signal is comprised of a series of infrared energy bursts in synchronism with said information pulses.

24. The system according to claim 9 wherein said coding circuit means is a modulator means including means for generating a discrete carrier frequency signal, said carrier frequency signal being amplitude modulated by said input signal, said modulator means providing an amplitude modulated information signal.

25. The system according to claim 24 wherein said signal receiver circuit is an amplitude modulation receiver circuit.

26. A light-emitting system for information transmission, comprising:
(a) at least one portable control unit having:
(i) controllable input means for generating an input signal indicative of the information to be transmitted;
(ii) coding circuit means coupled to said input means for receiving said input signal and for generating a coded information signal at a discrete transmission frequency;
(iii) a light-emitting device coupled to said coding circuit means for receiving said information signal, said light-emitting device transmitting a coded light signal in synchronism with the information signal; and
(iv) means coupled to said coding circuit means for automatically disconnecting a power supply means supplying electrical current for said control unit to shut down electrical power to said control unit when no new input information is detected by said coding circuit means for a predetermined period of time; and
(b) a receiver module having:
(i) a photodetector device for altering an electrical signal in accordance with the light signals received from said light-emitting devices to provide electrical information signals in synchronism with respective light signals;
(ii) a signal receiver circuit selectively tuned to the discrete transmission frequency of each of said control units for receiving and processing the electrical information signals indicative of the information transmitted from each control unit; and
(iii) decoding circuit means coupled to said receiver circuit for decoding the electrical information signals and generating decoded data signals indicative of the information received from the respective control units for transmission to a computing system or the like.

27. A transmitter unit for a light-emitting system for information transmission, comprising:
(a) controllable input means for generating an input signal indicative of the information to be transmitted;
(b) coding circuit means coupled to said input means for receiving said input signal and for generating a coded information signal at a discrete transmission frequency;
(c) a light-emitting device coupled to said coding circuit means for receiving said information signal, said light-emitting device transmitting a coded light signal in synchronism with the information signal; and
(d) means coupled to said coding circuit means for automatically disconnecting a power supply means supplying electrical current for said control to shut down electrical power to said control unit when no new information is detected by said coding circuit means for a predetermined period of time.

28. The transmitter unit according to claim 37 wherein said means for disconnecting said power supply means is a digital processor means.

29. The transmitter unit according to claim 28 wherein said digital processor means has an input coupled to said input means for receiving said input signal and an output coupled to said coding circuit means, said digital processor means transmitting a digital data signal indicative of said input signal to said coding circuit means.

30. A receiver module for an information transmission system, said receiver module receiving coded light signals from a plurality of transmitting devices, each having a discrete transmission frequency, said receiver module comprising:
(a) a photodetector device for altering an electrical signal in accordance with the light signals received from the transmitting devices to provide electrical information signals in synchronism with respective light signals;
(b) a signal receiver circuit selectively tuned to the discrete transmission frequency of each of said transmitting devices for receiving and processing said information signals in accordance with a predetermined sequence;
(c) tuning channel selection means for selectively tuning said receiver circuit to the discrete transmission frequency of each transmitting device in accordance with the a predetermined sequence, each transmission frequency corresponding to a respective channel on which information from a respective transmitting unit is received; and
(d) decoding circuit means coupled to said receiver circuit for decoding the information signals and generating decoded data signals indicative of the information received from the respective transmitting devices for transmission to a computing system or the like.

31. The receiver module according to claim 30 wherein said decoding circuit means includes a digital processor means for receiving and decoding the electrical information signals and for transmitting digital data to the computing system.

32. The receiver module according to claim 31 wherein said digital processor means automatically controls said tuning means to selectively tune said receiver circuit to receive information from each transmitting device separately in accordance with the predetermined sequence.

33. A light-emitting system for information transmission, comprising:
(a) a plurality of portable control units each having:
(i) controllable input means for generating an input signal indicative of the information to be transmitted;
(ii) coding circuit means coupled to said input means for receiving said input signal and for generating a coded information signal at a discrete transmission frequency;
(iii) a light-emitting device coupled to said coding circuit means for receiving said information signal, said light-emitting device transmitting a coded light signal in synchronism with the information signal; and
(b) a receiver module including:
(i) a photodetector device for altering an electrical signal in accordance with the light emitting devices to provide electrical information signals in synchronism with respective light signals;
(ii) a signal receiver circuit selectively tuned to the discrete transmission frequency of each of said control units for receiving and processing the electrical information signals indicative of the information transmitted from each control unit;

(iii) decoding circuit means coupled to said receiver circuit for decoding electrical information signals and generating decoded data signals indicative of the information received from the respective control units;

(iv) digital processor means coupled to said decoding circuit means for receiving the decoded data signals therefrom, said digital processor means transmitting digital data to a computing system or the like;

(v) the information signal transmitted from each control including a plurality of binary coded data bits for determining whether the information signal is in error, said plurality of data bits including at least one data bit identifying the control unit from which the information signal was transmitted and a parity code bit indicating whether there is an odd or even number of logical one bits in the information signal, said digital processor means being responsive to said at least one data bit for comparing the control unit to which the signal receiver circuit is tuned to receive information with the control unit identified by the at least one data bit and determining whether an error exists, said digital processor means being further responsive to said parity code bit for comparing the parity code indication with the actual number of logical one bits in the information signal and determining whether an error exists, said digital processor means being responsive to an error determination by preventing erroneous information signals to be transmitted to the computing system or the like.

34. A transmitting unit for a light-emitting system for information transmission, comprising:

(a) a digital joystick movable along an X-axis and a Y-axis for generating a first set of digital input signals indicative of the incremental position of said joystick along the X-axis and along the Y-axis;

(b) a keyboard having a plurality of key switches for generating a second set of digital input signals indicative of the respective states of the key switches;

(c) digital processor means having a plurality of input and output terminals, said joystick and said keyboard being coupled between selected input and output terminals of said digital processor means, said digital processor means for selectively scanning said joystick and said keyboard via selected output terminals and receiving said first and second sets of input signals via said selected input terminals, said digital processor means for generating respective digital coded information signals in accordance with said input signals;

(d) modulator means coupled to said digital processor means for receiving said information signals, said modulator means including means for generating a discrete carrier frequency signal, said carrier frequency signal being modulated by said information signals to provide modulated information signals for transmission; and (e) a light-emitting device coupled to said modulator means for receiving said modulated information signals, said light-emitting device transmitting coded light signals in synchronism with the modulated information signals. with the amplitude modulated information signal.

35. The transmitter unit according to claim 34 including channel selector means for controlling the modulator means to generate selected ones of a plurality of discrete carrier frequency signals, each representing a discrete channel on which information is transmitted.

* * * * *